Figure 1:
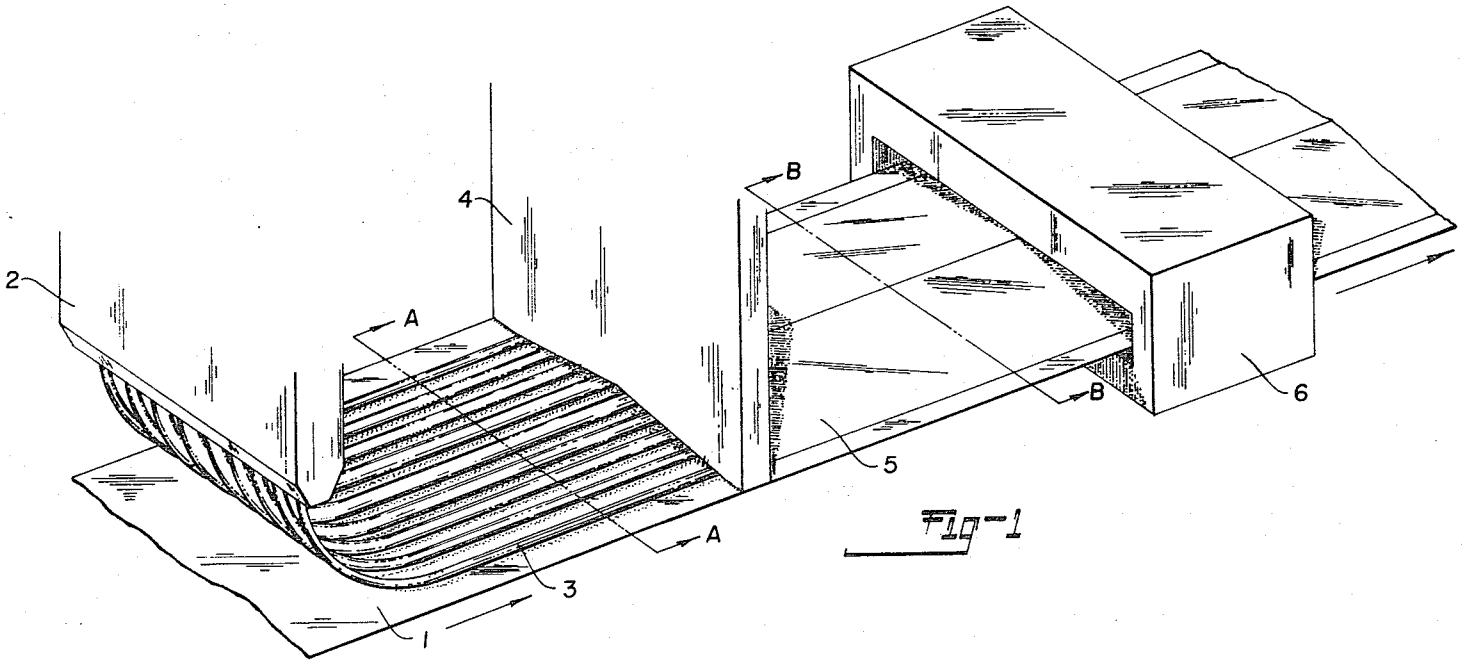
Figure 3:
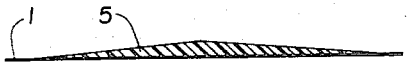
Figure 2:
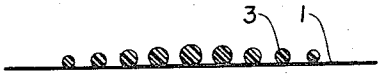

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JUNE 1, 1971

827 O.G. 7

T887,014

HOT MELT ADHESIVE TAPES FOR FILLING SEAMS BETWEEN ADJACENT DRY-WALL CONSTRUCTION BOARDS AND FOR OTHER PURPOSES

Howard L. Overbay and Parker J. Trent, both of P.O. Box 511, Kingsport, Tenn. 37601

Filed Nov. 16, 1970, Ser. No. 89,676
Int. Cl. B32b *1/04, 29/06, 31/20*
U.S. Cl. 161—118
2 Sheets Drawing. 14 Pages Specification

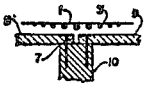

A seam sealing tape to fill voids between abutting sections or cracks in wall board or similar materials in a wall or ceiling construction, including a paper or other supporting tape coated on one surface with a hot melt adhesive which is a solid at room temperature but susceptible of melting and plastic flow by the application of heat to the uncoated surface of the tape. The adhesive is disposed on the supporting tape in one of two forms, that is, either as a continuous layer or coating or in the form of continuous beads disposed in parallel relation one to another along the length of the tape. In either form the adhesive is disposed on the tape in such manner as to provide a maximum amount of adhesive along the center line of the tape so that, when the tape is laid over a void with the adhesive side down and heat applied as with a hot iron, the void can be rapidly filled and covered in a single operation. The resulting sealed seam requires no drying step and can be completely obscured by painting or by the application of spackling compounds immediately after the sealing operation.

June 1, 1971 H. L. OVERBAY ET AL T887,014

HOT MELT ADHESIVE TAPES FOR FILLING SEAMS BETWEEN ADJACENT DRY-WALL CONSTRUCTION BOARDS AND FOR OTHER PURPOSES

Filed Nov. 16, 1970 2 Sheets-Sheet 1

HOWARD L. OVERBAY
PARKER J. TRENT
INVENTORS

BY Carl D. Gray Jr.
George P. Chandler
ATTORNEY

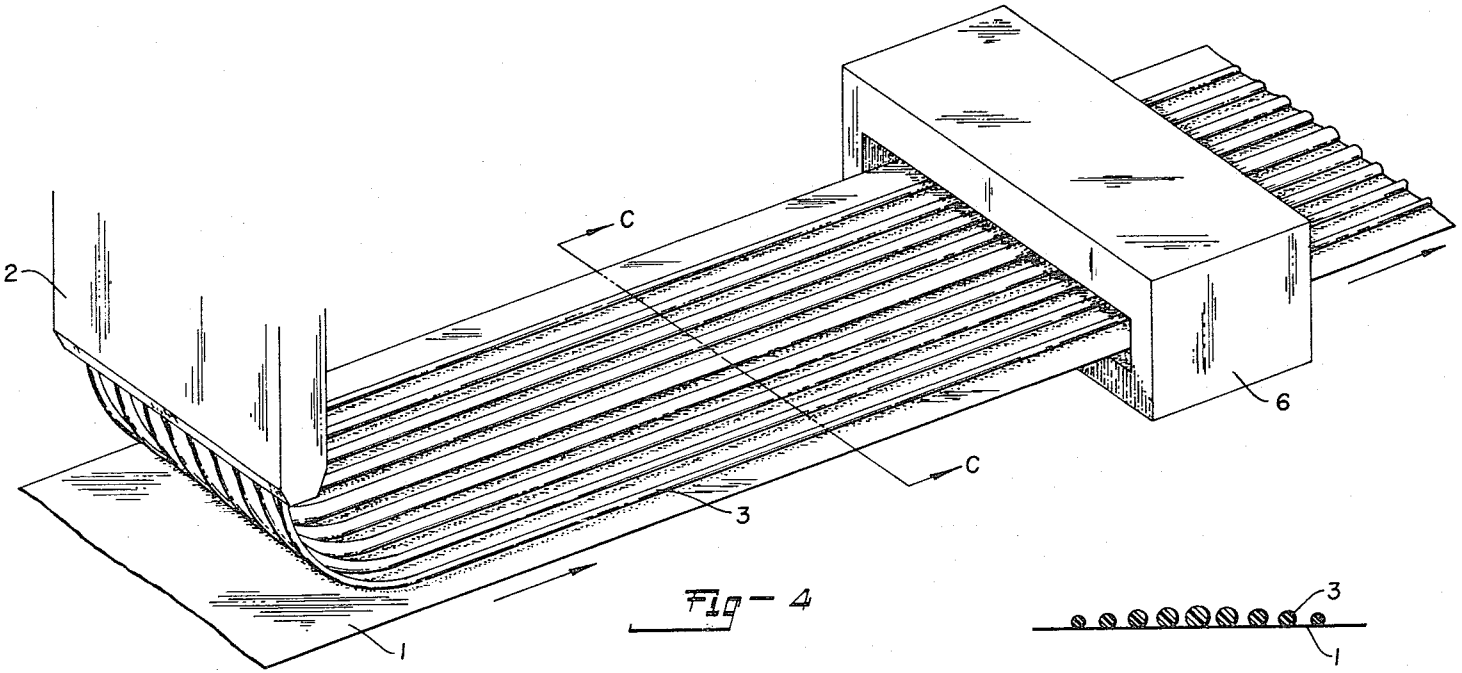
Fig-4
Fig-5
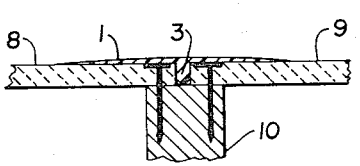
Fig-8
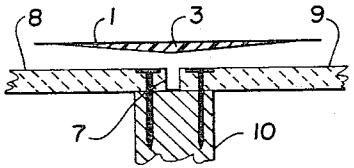
Fig-6
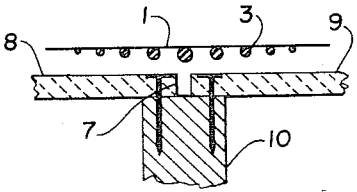
Fig-7
HOWARD L. OVERBAY
PARKER J. TRENT
INVENTORS
BY Cecil D. Quillen Jr.
George P. Chandler
ATTORNEY